United States Patent
Nishida et al.

[11] Patent Number: 5,385,035
[45] Date of Patent: Jan. 31, 1995

[54] REFRIGERANT CYCLE CONTROL SYSTEM

[75] Inventors: Shin Nishida, Anjo; Hiroshi Inatsu, Setagaya, both of Japan

[73] Assignee: Nippondenso Co., Ltd., Kariya, Japan

[21] Appl. No.: 184,134

[22] Filed: Jan. 19, 1994

[30] Foreign Application Priority Data

Jan. 19, 1993 [JP] Japan .................... 5-006617

[51] Int. Cl.⁶ .............................................. F25B 39/02
[52] U.S. Cl. ................................... 62/525; 62/200
[58] Field of Search ............ 62/524, 525, 205, 210, 62/200

[56] References Cited

U.S. PATENT DOCUMENTS 2,053,945  9/1936  Cowin .................... 62/524 X

FOREIGN PATENT DOCUMENTS 0082426  5/1985  Japan .................... 62/525
63-33061  7/1988  Japan .
343847    9/1991  Japan .

*Primary Examiner*—William E. Wayne
*Attorney, Agent, or Firm*—Cushman, Darby & Cushman

[57] ABSTRACT

A solenoid valve 70 is disposed in a pipe line between an expansion valve 60 and an evaporator 80 for rear seats side. When the cooling operation is switched to the operation of utilizing only evaporator 50 for front seats side from the operation of utilizing evaporators 50 and 80 for front seats side and rear seats side, the solenoid valve 70 is closed by closing the operation switches Sc and Sf. The solenoid valve 70 can restrain an occurrence of water hammer phenomenon by stopping a refrigerant flow in air-liquid phase at the downstream of an expansion valve.

4 Claims, 1 Drawing Sheet

REFRIGERANT CYCLE CONTROL SYSTEM

BACKGROUND OF THE INVENTION

This invention relates to a refrigeration cycle utilized for both of refrigeration system and air conditioning system which are equipped in a vehicle or a general building, and further relates to a refrigeration cycle utilized for air conditioning system, etc. which can air-condition front and/or rear seat spaces in the vehicle, or separated spaces in the building concurrently or selectively. More particularly, this invention relates to a refrigeration cycle control system for controlling above refrigeration cycles.

As disclosed in Japanese examined patent publication No. 63-33061, for instance, a refrigeration cycle conventionally has an expansion valve for refrigeration and an expansion valve for cooling which are connected to a compressor in series and connected each other in parallel, an evaporator for refrigeration connected to the expansion valve for refrigeration in series at the downstream of the refrigeration valve and an evaporator for cooling connected to the expansion valve for cooling in series at the downstream of the cooling valve and constructing parallel circuit with the cooling expansion valve to a circuit including the refrigeration expansion valve and evaporator. In the above refrigeration cycle, a solenoid valve is provided in the parallel circuit at the upstream of and in series of the cooling expansion valve. The cooling evaporator operates to cool while the solenoid valve is open. The solenoid valve is switched to be closed when only the refrigeration evaporator is switched to operate.

However, the refrigeration cycle has following drawbacks. First both evaporators are operated, and when the operation is switched to operate only the cooling evaporator, the solenoid valve is closed. At the same time vibration and/or noise arise around pipe line at the upstream side of the solenoid valve and the cooling evaporator due to water hammer phenomenon because liquid refrigerant flow in low compressibility at the upstream of the solenoid valve is suddenly stopped when the solenoid valve is closed.

SUMMARY OF THE INVENTION

Therefore an object of the present invention is to restrain the occurrence of water hammer phenomenon and to decrease the vibration and/or noise arisen by water hammer phenomenon.

To achieve the object, the refrigeration cycle control system includes a compressor for circulating refrigerant in a refrigerant cycle, a condenser connected to the compressor in series, first and second pressure reducing means arranged in parallel each other and respectively connected to the condenser in series, a first evaporator connected to the first pressure reducing means in series at the downstream of the first pressure reducing means, a second evaporator connected to the second pressure reducing means in series at the downstream of the second pressure reducing means, and constructing a parallel circuit with the second pressure reducing means to a circuit including the first pressure reducing means and the first evaporator, a solenoid valve connected between the first pressure reducing means and the first evaporator, or between the second pressure reducing means and the second evaporator in series, and a control means for controlling the solenoid valve to be closed when a cooling operation is switched to operate only one evaporator which is, non-connected to the solenoid valve in series, from the cooling operation operating two evaporators with the solenoid valve in open-state.

In the refrigeration cycle system mentioned above, when the solenoid valve is closed, the refrigerant flow discharged from the expansion valve suddenly stops. Since the refrigerant discharged from the expansion valve is in air-liquid phase mixture state, the discharged refrigerant has shock absorption against the pressure rise accompanied by a sudden stop of the refrigerant flow, so that the shock by water hammer phenomenon is significantly mitigated. This significantly reduces the vibration and noise caused around the pipe at the upstream side of the solenoid valve and the evaporator at the downstream of the solenoid valve when the solenoid valve closes.

DETAILED DESCRIPTION OF THE PREFERRED EMBODIMENT

Figure 1:
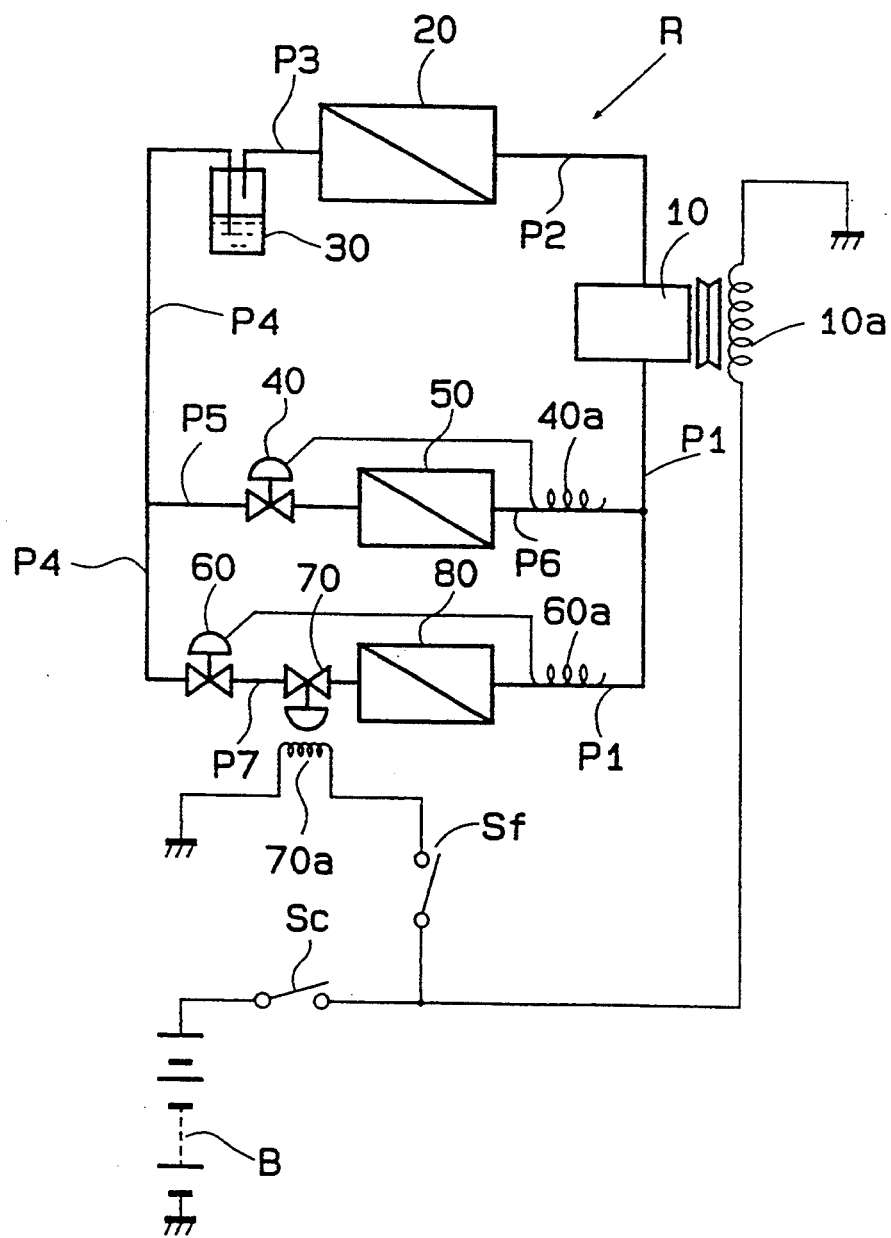
FIG. 1 is a schematic diagram of a refrigeration cycle control system of the present invention.

Referring to FIG. 1, there is an embodiment of the refrigeration cycle control system for an automotive air conditioner of the present invention.

A refrigerating cycle R has a compressor 10. The compressor 10 is driven by a transmission of power source from an engine of a vehicle via a magnetic clutch 10a. The compressor 10a compresses low pressure gaseous refrigerant an the downstream of a pipe line P1 and discharges high pressure and high temperature refrigerant into a pipe line P2. The magnetic clutch 10a transfers power source from the engine to the compressor 10.

A condenser 20 condenses the compressed gaseous refrigerant in the pipe line P2 by cooling fan (not shown) and sends the condensed refrigerant to a receiver 30 through a pipe line P3. The receiver 30 separates the condensed refrigerant from the condenser 20 into gas and liquid and flows the liquid refrigerant to an upstream side of a pipe line P4 as a circulating refrigerant. The circulating refrigerant flows from the upstream side of the pipe line P4 to the expansion valve 40 through an upstream side of a pipe line P5. The expansion valve 40 reduces the pressure of circulating refrigerant responding to an open ratio thereof so that pressure reduced refrigerant in gas-liquid phase flows into an evaporator 50 located around the front seat in a compartment through downstream side of the pipe line P5. The open ratio of the expansion valve 40 varies depending on a refrigerant temperature in a pipe line P6 detected by a temperature-sensitive tube 40a disposed on the pipe line P6 near an refrigerant outlet of the evaporator 50.

The evaporator 50 cools down the air blowing toward the front seats in the compartment with a latent heat of evaporation of the pressure reduced refrigerant and sends the refrigerant to the compressor 10 through the pipe line P6 and the downstream of the pipe line P1.

As shown in FIG. 1, a circuit of the downstream side of the pipe line P4, a pipe line P7 and the upstream side of pipe line P1 including an expansion valve 60, a normally close type solenoid valve 70 and an evaporator 80 disposed around rear seats is parallel connected to a serial circuit of the pipe line P5, the expansion valve 40, the evaporator 50 and the pipe line P6.

The expansion valve 60 reduces the pressure of circulating refrigerant responding to an open ratio thereof so that pressure reduced refrigerant in gas-liquid phase flows into the evaporator 80 through the pipe line P7 and the solenoid valve 70. The open ratio of the expansion valve 60 varies depending on a refrigerant temperature in the upstream side of the pipe line P1 detected by a temperature-sensitive tube 60a disposed around a refrigerant outlet of the evaporator 80 and at the upstream of the pipe P1. The expansion valves 40 and 60 are pressure reducing means for reducing a pressure of the refrigerant and expanding the refrigerant.

The solenoid valve 70 is a material component in the present invention and disposed in the pipe line P7. The solenoid valve 70 flows the pressure reduced refrigerant into the evaporator 80 from the expansion valve 60 through the pipe line P7 when the solenoid valve 70 is open by excitation of a solenoid 70a.

On the other hand, the solenoid valve 70 shuts the pressure reduced refrigerant flowing into the evaporator 80 from the expansion valve 60 through the pipe line P7, when the solenoid valve 70 is closed by non-excitation of the solenoid 70a. The evaporator 80 cools down the air blowing towards the rear seats in the compartment with a latent heat of evaporation of the pressure reduced refrigerant and sends the refrigerant to the compressor 10 through the pipe line P1.

An electrical control circuit for the embodiment is described hereinafter. An operation switch Sc supplies DC voltage power to an electromagnetic clutch 10a from a battery B as a vehicle power source when the switch Sc is closed and engages the clutch 10a to the compressor. An operation switch Sf supplies DC voltage power to the solenoid 70a from the battery B when the both switches Sf and Sc are closed so that the solenoid 70a is excited. The switch Sf breaks the D voltage power from the battery B to the solenoid 70a when the switch Sf is released to be open and the solenoid 70a is degaussed.

In this embodiment of the present invention, when the engine on the vehicle is running, the both switches Sc and Sf are closed. The clutch 10a engages with the compressor 10 in response to the close-state of the operation switch Sc. The compressor 10 operates by transferred power from the engine (not shown) via magnetic clutch 10a. The refrigerant at the downstream of the pipe line P1 is sucked and compressed by the compressor 10. The compressed refrigerant flows into the condenser 20 through the pipe line P2.

Then the condenser 20 condenses the compressed refrigerant from the compressor 10 and flows it into the receiver 30 through the pipe line P3. The receiver 30 separates the condensed refrigerant into gas and liquid. The liquid refrigerant flows into the upstream of the pipe line P4 as a circulating refrigerant and then the solenoid valve 70 is open by the close-state of operation switches Sc and Sf and receiving the power from the battery B.

The expansion valve 40 sends the pressure reduced circulating refrigerant to the evaporator 50 through the downstream side of the pipe line P5 after receiving the circulating refrigerant from upstream side of the pipe lines P4 and P5 and depressurizing the circulating refrigerant to be the pressure reduced refrigerant responding to the open ratio decided by the refrigerant temperature detected by the temperature-sensitive tube 40a.

The evaporator 50 cools the air blowing towards the front seats in the compartment and the refrigerant returns to the compressor 10 through the downstream side of the pipe lines P6 and P1. As stated above, the circulating refrigerant flows into the expansion valve 60 from the upstream side of the pipe line P4 through the downstream side of the pipe line P4.

The expansion valve 60 depressurizes the circulating refrigerant so that the circulating refrigerant is changed to be the pressure reduced refrigerant in gas-liquid phase by the open ratio of the expansion valve 60 responding to the detected refrigerant temperature by the temperature sensitive-tube 60a. The pressure reduced refrigerant flows into the evaporator 80 through the pipe line P7 and the solenoid valve 70. The evaporator 80 cools the air blowing towards the rear seats in the compartment and the refrigerant returns to the compressor 10 through the pipe line P1.

Consequently, cooling air for passengers in front and rear seats is achieved. Under this situation, when the switch Sf is open to switch the operation cooling for only front seats side, the solenoid valve 70 is closed by the degauss of the solenoid 70a and shuts the pressure reduced refrigerant flowing into the evaporator 80 through the pipe line P7 from the expansion valve 60. Consequently, air conditioning only for the front seats side is continued to flow the refrigerant into the evaporator 50.

The shut of the pressure reduced refrigerant by the solenoid valve 70 suddenly stops the pressure reduced refrigerant flow at the upstream side of the solenoid valve 70. The pressure reduced refrigerant in gas-liquid phase has shock absorption against the pressure rise in the pipe line P7 so that the shock by water hammer phenomenon in the pipe lines P4 and P7 is mitigated. This significantly reduces the vibration and noise caused around the pipe at the upstream side and the evaporator at the downstream when the solenoic valve 70 closes. Since the solenoid valve 70 is disposed upstream of the evaporator 80, the evaporator 80 can De designed in low pressure-tight strength.

As a modification of this embodiment, instead of the evaporator 50 for the front seats side, an evaporator for refrigeration may be adopted as a refrigeration means for a small refrigerator in a tray or rear trunk of a vehicle. Instead of the evaporator 80 for rear seats side, the evaporator 50 for front seats side is adopted. In this case the solenoid valve 70 is closed when the operation is switched from the operation of both refrigeration and cooling to only the operation of refrigeration so that the same operation and effectiveness as the above embodiment is achieved.

It is nevertheless not limited to the refrigeration cycle control system for a vehicle, the present invention may be utilized for a variety of the refrigeration cycle control system e.g. in case of controlling a refrigeration cycle for an air conditioning system and/or refrigerator system equipped in a general building, or a refrigeration cycle for air conditioning system which air conditions in separated places concurrently or selectively. Further the evaporators 50 and 80 may be exchangeable each other.

The solenoid valve 70 and operation switch Sf may also be adopted upstream of the evaporator 50 and in this case either front seats side or rear seats side is cooled independently.

Furthermore a normally open type solenoid valve, instead of the normally closed type valve 70, may be adopted. In this case, the normally open solenoid valve is closed by the closed action of the operation switch Sf.

What is claimed is:

1. An refrigerant cycle control system comprising:
   a compressor for circulating refrigerant in the system;
   a condenser connected to the compressor in series;
   a first and a second pressure reducing means arranged in parallel each other and respectively connected to the condenser in series;
   a first evaporator connected to the first pressure reducing means in series at the downstream thereof;
   a second evaporator connected to the second pressure reducing means in series at the downstream thereof and constructing a parallel circuit with the second pressure reducing means to a circuit including the first pressure reducing means and the first evaporator;
   a solenoid valve connected one of between the first pressure reducing means and the first evaporator, and between the second pressure reducing means and the second evaporator in series; and
   a control means for controlling the solenoid valve to be closed when a cooling operation is switched to operate only one evaporator which is non-connected to the solenoid valve in series, from the cooling operation operating two evaporators with the solenoid valve in open-state.

2. An refrigerant cycle control system according to claim 1, wherein the solenoid valve is a normally close type solenoid valve.

3. An refrigerant cycle control system for a vehicle having an engine, comprising:
   a compressor for circulating refrigerant in the system and driven by the engine;
   a condenser connected to the compressor in series;
   a first and a second expansion valves arranged in parallel each other and respectively connected to the condenser in series;
   an evaporator for front seats side connected to the first expansion valve in series at the downstream thereof;
   an evaporator for rear seats side connected to the second expansion valve in series at the downstream thereof and constructing a parallel circuit with the second expansion valve to circuit including the first expansion valve and the evaporator for rear seats side;
   a solenoid valve connected between the second expansion valve and the evaporator for rear seats side in series; and
   a control means for controlling the solenoid valve to be closed when a cooling operation is switched to operate only the evaporator for front seats side which is non-connected to the solenoid valve in series, from the cooling operation operating two evaporators with the solenoid valve in open-state.

4. An refrigerant cycle control system for a vehicle having an engine according to claim 3, wherein the solenoid valve is a normally close type solenoid valve.

* * * * *